US011859724B2

(12) United States Patent
Lindsey (10) Patent No.: US 11,859,724 B2
(45) Date of Patent: Jan. 2, 2024

(54) CHECK VALVE (71) Applicant: LONTRA LIMITED, Warwickshire (GB)

(72) Inventor: Stephen Francis Lindsey, Warwickshire (GB)

(73) Assignee: LONTRA LIMITED, Warwickshire (GB)

( * ) Notice: Subject to any disclaimer, the term of this patent is extended or adjusted under 35 U.S.C. 154(b) by 0 days.

(21) Appl. No.: 17/598,640

(22) PCT Filed: Mar. 27, 2020

(86) PCT No.: PCT/GB2020/050831
§ 371 (c)(1),
(2) Date: Sep. 27, 2021

(87) PCT Pub. No.: WO2020/193990
PCT Pub. Date: Oct. 1, 2020

(65) Prior Publication Data
US 2022/0186851 A1 Jun. 16, 2022

(30) Foreign Application Priority Data
Mar. 27, 2019 (GB) .................................. 1904245.6

(51) Int. Cl.
F16K 15/18 (2006.01)
F16K 15/03 (2006.01)
F16K 31/122 (2006.01)

(52) U.S. Cl.
CPC ........ F16K 15/1821 (2021.08); F16K 15/034 (2021.08); F16K 15/1826 (2021.08); F16K 31/1223 (2013.01)

(58) Field of Classification Search
CPC .................... F16K 15/1821; F16K 15/1826
See application file for complete search history.

(56) References Cited

U.S. PATENT DOCUMENTS 3,631,888 A * 1/1972 Anton ................... F15B 13/015
251/63.4
3,850,194 A 11/1974 Brown
4,029,290 A 6/1977 Karpenko
(Continued)

FOREIGN PATENT DOCUMENTS

CN 107806522 3/2018
GB 2278905 12/1994

OTHER PUBLICATIONS

United Kingdom Intellectual Property Office Search Report issued in co-pending application No. GB1904245.6 dated Sep. 5, 2019.
(Continued)

Primary Examiner — Kevin F Murphy
(74) Attorney, Agent, or Firm — Whiteford, Taylor & Preston, LLP; Peter J. Davis (57) ABSTRACT A check valve (1) which comprises an obturator (2) and a biasing mechanism, the biasing mechanism arranged to urge the obturator towards a closed condition, and the check valve further comprising an actuator assembly (5, 7a, 7b) which is arranged to be selectively activated to cause the obturator to be in an open condition, and the check valve comprising a controller which has a control signal input to cause the controller to selectively activate the actuator assembly.

23 Claims, 6 Drawing Sheets (56) References Cited

U.S. PATENT DOCUMENTS

| | | | |
|---|---|---|---|
| 4,669,500 A | 6/1987 | Strelow | |
| 9,200,648 B2 * | 12/2015 | Lumkes | F16K 15/1826 |
| 10,107,405 B2 * | 10/2018 | Huang | F16K 1/2021 |
| 2017/0307093 A1 * | 10/2017 | Yo | F16K 15/026 |

OTHER PUBLICATIONS

International Search Report issued in co-pending application No. PCT/GB2020/050381 dated Jun. 25, 2020.

* cited by examiner

CHECK VALVE

TECHNICAL FIELD

The present invention relates to check valves.

BACKGROUND

Check valves (also known as non-return valves, clack valves, reflux valves, retention valves and one-way valves) are typically used on the outlet (pipe) of pumps/compressors to prevent backflow from the pressurised pipe network back through the compressor when it is stopped (or develops a fault to cause it to stop). A backflow could cause the pressurised fluid to leak out to atmosphere through the compressor, in a potentially sudden manner, potentially damaging the compressor and/or electrical system.

Known check valves for large air/water applications are designed with the obturator like a flap, where either the weight of the flap and/or a spring or resilient component provide a bias which tends to close the flap, while when a higher pressure is present on the compressor side which is higher than the pressure on the outlet side will tend to open the flap. Such known valves can also be of a butterfly design/type, or goose-neck valves, ball valves and plug valves.

Because such valves rely on the flow of fluid to maintain them in an open condition, they will typically never be fully open (as in that scenario there would be no force to counteract the weight/spring force to keep it open). This means that even in the optimal constant flow case, they introduce some pressure drop across the (partially) open flap element. Even in constant flow, traditional flaps can oscillate due to vortex shedding.

Known positive-displacement compressors/devices typically create a pulsating flow on their outlet as each successive chamber containing pressurised fluid opens to the outlet pipe.

We have appreciated that such flow pulsations can pose a problem for check valves because they tend to oscillate between the open and part-open states (i.e. states in which the flap element of obturator provides a larger opening than in the other state).

This results in the introduction of an even greater pressure drop, as when a high-pulse comes along the valve is still partially closed from the previous low-pressure phase. The fluttering of the flap element which this causes is noisy, and may cause the valve to fail earlier as a result due to fatigue.

We seek to overcome the problem of the steady-state pressure drop, and that of fluttering in pulsating flow. We have devised an improved check valve, which may include an electrical control input and a secondary activation mechanism. The improved check valve may be intended for use with compressed air as the main medium, but can be used for other fluids, or incompressible fluids, or on the inlet of a fluid moving device (such as a pump or a compressor).

SUMMARY

According to a first aspect of the invention there is provided a check valve which comprises an obturator and a biasing mechanism, the biasing mechanism arranged to urge the obturator towards a closed condition, and the check valve further comprising an actuator assembly which is arranged to be selectively activated to cause the obturator to be in an open condition, and the check valve comprising a controller which has a control signal input to cause the controller to selectively activate the actuator assembly and to selectively de-activate the actuator assembly.

The check valve may be any check valve type.

The invention may be viewed as an enhanced check valve.

The controller may be considered as controlling the mode of operation of the check valve.

The activated actuator assembly is preferably arranged in use to override the biasing mechanism.

The invention may comprise a passive obturator that is normally opened by the fluid flow, but which by its nature still causes a pressure drop across it.

The invention may generally be said to comprise an actuator that moves the obturator into a position more open than it would be purely from the effect of fluid flow reducing pressure drop (and reducing oscillation/wear etc.). On receipt of a signal of some type, the actuator preferably moves the obturator further out of impeding the flow (vis a vis the surface area presented to the flow) than the flow would move it on its own by virtue of the action of the flow and the associated pressure drop. The actuator assembly may be seen as assisting the flow of fluid to cause the obturator to open to a greater extent. The actuator assembly may be seen as being operative to move the obturator further open that it would move under the action of the flow, and so thereby reduce the pressure drop across the valve.

The actuator assembly may be arranged to cause the obturator to open to a more fully open condition from a less open condition. The actuator assembly may be arranged only to be activated when the obturator is in a partially open condition (e.g. due to flow of fluid). The actuator assembly may be arranged to open the obturator to a fully or substantially fully open condition.

The controller may be arranged to maintain the activation of the actuator assembly to hold the obturator in an open condition during operation of a fluid displacement device to urge fluid through a fluid port of the device, which fluid port the check valve is connected to. Reference to the check valve being connected to a fluid port (e.g. an inlet or an outlet) of a fluid displacement device includes a direct/immediate connection thereto, as well as including an indirect connection e.g. one in which one or more components or assemblies lie intermediate of the fluid port and the check valve (e.g. a filter, a silencer or an oil separator). The operational mode of the check valve may at least in part be dependent on an operational status of a fluid displacement device (as indicated by the input control signal).

The controller may be arranged to de-activate the actuator assembly in response to receipt of a control input which is indicative of either a depowering of the fluid displacement device or of a change in operational status of the fluid displacement device from an operational condition to a non-operational condition. This may be achieved either by the absence or discontinuation of a signal which indicates the operation of the fluid displacement device, or by way of a signal which (positively) indicates a change of operational status. The controller may be arranged to de-activate the actuator assembly (from maintaining the obturator in an open condition) in response to an absence of a signal input to the controller indicative of the operation of a fluid displacement device, a fluid port of which the check valve is connected to.

The check valve may be considered as having an operational default condition of the biasing mechanism, which is preferably a passive device/entity. This may be brought about as a result of a non-existent or discontinued input control signal.

The control signal input may comprise a terminal or a port, which is arranged to receive an electrical signal.

The signal to open the valve may be a sensing of flow (from one or various known flow measurement devices from mechanical (flap etc.) to electrical (hot wire, surface acoustic wave, vortex shedding (vibration measuring) etc.) to pressure (pitot tube etc.). This assumes that the valve has already opened partially (in passive mode) and then the sensing device detects the flow and actuates the valve to open more fully.

The actuator assembly may comprise a pressure-activated actuator.

The controller may be arranged to cause one of two fluid pressure sources to act at least in part on the actuator assembly.

Connection to one pressure source may permit the biasing mechanism to operate, and connection to the other pressure source causes the obturator to be urged into the open condition. It will be appreciated that this includes connection to a vacuum as opposed to a (positive) pressure source, in which when connected/switched to a vacuum source the obturator is caused to be urged into the open condition.

The controller may comprise a switch which is arranged to bring about control of which pressure source the actuator assembly is connected to.

The actuator assembly may comprise a motive component of which each opposing side or end is arranged to be acted on by a respective pressure source, and the fluid pressure to which at least one of the sides/ends of the components is subjected to is controlled by the controller. The motive component may comprise a piston moveable within a cylinder, or diaphragm or a bellows or a bladder assembly.

The controller may be arranged to allow the motive component to be selectively subjected to a pressure differential in which one side/end of the motive component is subjected to a higher fluid pressure than the other side/end of the motive component.

Any pressure difference within the fluid system (on which the check valve operates) or between the fluid system and atmosphere or another pressure reference or source, can be used. For example, a vacuum system, where the difference between the pipework (always at partial vacuum) and the atmosphere or other pressure source may be used to actuate the valve.

Whilst the actuation method of the actuator assembly may use pressure from the pipework/fluid system for activation, other motive forces, including electromagnetic (solenoid replacing the cylinder, or motor and rack replacing the cylinder), shape metal actuator, or some other type, could be employed.

The controller may further allow both ends/sides of the motive component to be selectively subjected to substantially equal fluid pressures.

The check valve may be such that the fluid pressure to which one side/end of the motive component is subjected to is not alterable to another pressure by the controller. Said side/end of the motive component may be substantially invariably connected to a single fluid pressure source.

The controller may comprise a switching valve. The switching valve may comprise a fluid outlet and a first fluid inlet and a second fluid inlet, and the controller operative in use to selectively connect the fluid outlet to either the first fluid inlet or the second fluid inlet.

The actuator assembly may comprise a piston which is moveable within a piston chamber, and the piston defines two sub-chambers, a first sub-chamber which is selectively connectable to a first pressure and to a second pressure, and a second sub-chamber which is connected to the first pressure. The actuator assembly may comprise a single piston acting within a cylinder. The piston may be arranged to move/operate over part of the valve movement range/stroke.

The switching valve may be arranged to control which of the first fluid pressure and the second fluid pressure is connected with the second sub-chamber.

The actuator assembly may comprise a first conduit which connects the controller to the first pressure and a second conduit which connects the controller to the second fluid pressure.

Where the controller may make use of controlling a connection to a first fluid pressure and to a second fluid pressure, the first fluid pressure is lower than the second fluid pressure, or vice versa. Further wherein, the controller may make use of the first and second pressures to achieve, at the actuator assembly either a pressure differential or a substantial equalisation of pressures at the actuator assembly.

The first fluid pressure may be atmospheric pressure and the second fluid pressure may be the pressure of fluid in a fluid containing conduit to which the check valve is arranged to be operatively connected.

The check valve may comprise a linkage which connects actuator assembly to the obturator.

It will be appreciated that the controller may alternatively or in addition comprise a pneumatic assembly or a manually operated switch (in order to effect control over the actuator assembly).

In use, the check valve may be connected downstream (i.e. to a fluid outlet) of a fluid displacement device (such as a compressor), or upstream of an inlet of a fluid displacement device (such as a suction pump).

The biasing mechanism is preferably a passive (as opposed to active) mechanism to urge the obturator to a closed condition. The actuator assembly may viewed as being configured to actively open the obturator and is not arranged or configured to (actively) close the obturator i.e. the activation of the actuator serves solely to urge the obturator into an open condition. However, the actuator assembly may be configured to (actively) close the obturator in addition to being capable to urging the obturator to an open condition. The actuator assembly may be termed an obturator opening actuator.

The expression 'biasing mechanism' may be considered as including any device or arrangement which urges the obturator towards a closed condition, and may comprise a spring or other resilient component and/or may include the weight of the obturator or a weighted portion provided with the obturator to achieve that outcome. The biasing mechanism may be arranged to provide a high or very high/ significant force to the obturator. This causes the obturator to be closed very rapidly. The biasing mechanism may more generally be termed an obturator bias or a bias arrangement.

The actuator assembly may be viewed as an override mechanism to the biasing mechanism.

By 'motive component' we include a component which is arranged to be displaced (either translationally or angularly) in response to an applied pressure differential.

The controller may be thought of as being configured to receive the control signal and selectively activate when the actuator assembly causes the obturator to adopt the open condition.

The switching valve may comprise a solenoid. The switching valve may comprise a three port two-way switching valve (which may be controlled by one or more solenoids). The switching valve may control the connection of the actuator assembly to one of two pressure sources.

The fluid which the check valve is configured to regulate is preferably fluid in a gaseous state.

The piston may be connected to an arm which is connected to the obturator. The arm may comprise an articulated arm or linkage.

The piston chamber may comprise a cylinder.

By 'open condition' we include that the obturator is in a partially open, or fully open or substantially fully open condition.

It will be appreciated that the actuator assembly may not need to move through its entire range of movement to move the obturator to an open condition, rather it could be arranged so that it only has an active stroke, or that the obturator could be moved over a restricted range from partially open to fully open.

The actuator assembly may be arranged to lock the obturator in an open condition. The actuator assembly may comprise a latch which when the actuator assembly is activated locks or retains the obturator into an open condition and the lock on the obturator in the open condition is released when the actuator is activated subsequently or is deactivated. This could involve a first activation to an open condition and a second activation to release the obturator from being held in an open condition.

The controller may include a damper, a time lag/activation delay to response or hysteresis, so to prevent pulsation or pressure wave from affecting the actuator/system.

According to a second aspect of the invention there is provided a fluid displacement system which comprises a check valve of the first aspect of the invention and a fluid displacement device.

According to a third aspect of invention there is provided a fluid displacement device, a fluid port of which is provided with a check valve of the first aspect of the invention.

The check valve can beneficially be used with any type of fluid displacement device, including a rotary piston and cylinder device, which comprises a rotor and a stator, the stator at least partially defining an annular cylinder space, the rotor may be in the form of a ring, and the rotor comprising at least one piston which extends from the rotor ring into the annular cylinder space, or working chamber, and in use the at least one piston is moved circumferentially through the cylinder space on rotation of the rotor relative to the stator, the rotor body being sealed relative to the stator, and the device further comprising cylinder space shutter which is capable of being moved relative to the stator to a closed position in which the shutter means partitions the annular cylinder space, and to an open position in which the shutter means permits passage of the at least one piston, the cylinder space shutter may comprising a rotatably mounted shutter (disc). An example of such a device is disclosed in EP 2334908. The check valve may also be used with a dynamic pump or a positive displacement pump or device, including: rotary pumps: (e.g. gear pumps, screw pumps and rotary vane pumps), reciprocating pumps: (e.g. plunger pumps. piston pumps, diaphragm pumps and circumferential piston pumps), linear Pumps (e.g. rope pumps. chain pumps and progressive cavity pumps), linear, rotary and reciprocating compressors.

The check valve may include an obturator position sensor or an operational status sensor which may monitor an obturator position, pressure drop across valve, and/or flow through the valve.

Check valves are often used when multiple gases are mixed into one gas stream. A check valve can be installed on each of the individual gas streams to prevent mixing of the gases in the original source.

Check valves are also used in many fluid systems, such as those in chemical and power plants. Applications in the nuclear industry include feed water control systems; dump lines; make-up water; miscellaneous process systems; N2 systems; and monitoring and sampling systems. In aircraft and aerospace, check valves are used where high vibration, large temperature extremes and corrosive fluids are present.

The check valve may be a 'stand-alone' device and so installed in pipe work not necessarily next to a compressor.

Any of the above aspects, or further aspects, of the invention may include one or more features, either individually or in combination, shown in the drawings and/or as described in the description.

BRIEF DESCRIPTION OF THE DRAWINGS

Various embodiments of the invention will now be described by way of example only in which.

DETAILED DESCRIPTION

There is now described a check valve which comprises an obturator (or flap) which is moveable from an open condition to a closed condition and vice versa, and a pressure-activated actuator (which may be termed a secondary activation mechanism) which causes the obturator to be selectively held in an open condition, and in use overriding the biasing mechanism and its tendency to urge or move the flap element to a close d condition. The embodiment described below is in relation to the check valve provided at or connected to an outlet of an air compressor.

Figure 1:
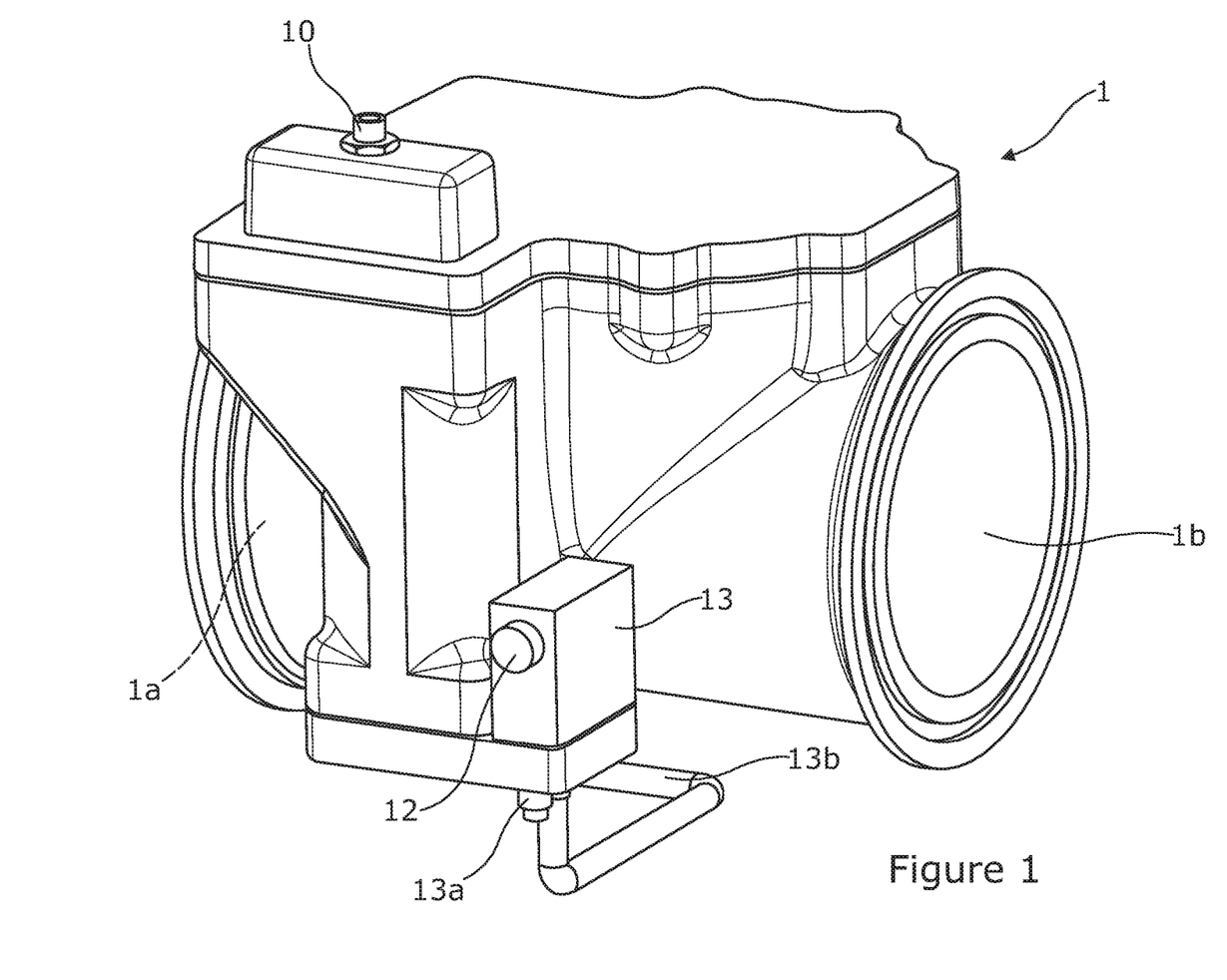
FIG. 1 is a perspective external view of a check valve.
Figure 2:
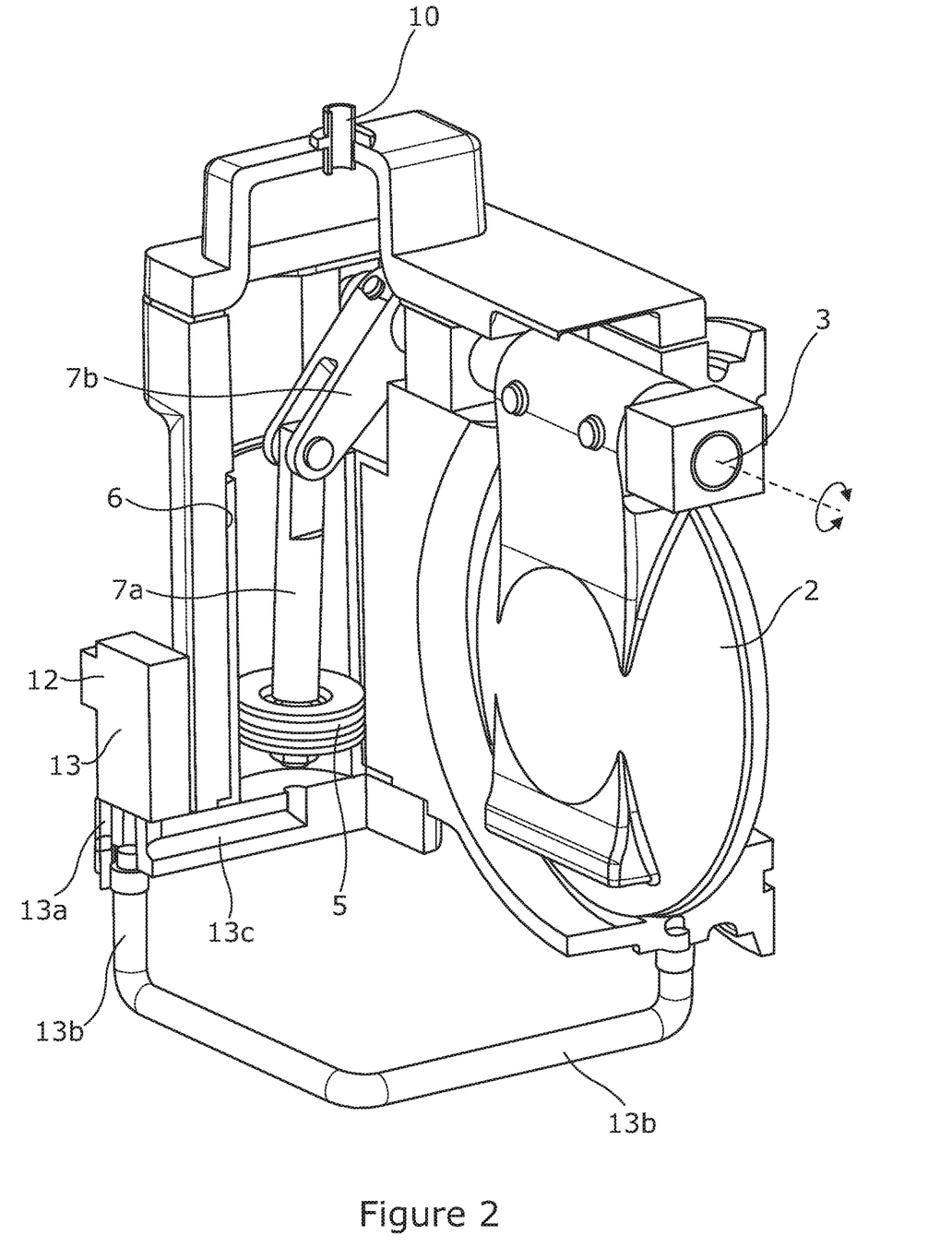
FIG. 2 is a perspective view demonstrating various internal components of the check valve.

Reference is made to FIGS. 1 and 2. The main body or carcass of the check valve 1 is similar to a traditional check valve: it comprises a flap 2, which closes under its own weight (or by/in addition to a spring force, which could be a coil spring or an air spring). The check valve could also be of the butterfly valve type. The check valve 1 comprises a fluid inlet 1a and a fluid outlet 1b.

The flap 2 is mounted on a pivot shaft 3. The pivot shaft 3 allows the flap to rotate about an axis from an opened condition to a closed condition and vice versa.

In the illustrated example, the secondary activation mechanism referred to above comprises a piston 5 which is moveable in a cylinder 6. The piston is connected to an articulated linkage which comprises a piston rod 7a and an arm 7b, and the parts 7a and 7b pivotably connected. The arm 7b is fixedly connected to the shaft 3, such that activation of the actuator assembly drives/causes movement of the piston to cause the flap 2 to open.

The piston 5 divides the cylinder space into two sub-chambers. One side of the piston 5 (shown as the upper part in the Figures, although orientation is not important) is always connected to atmosphere or atmospheric pressure through a vent 10. The other side of the piston 5, i.e. the lower sub-chamber as illustrated, can be selectively connected to either atmospheric pressure or the pressurised fluid (i.e. compressed air) in the pipe to which the valve 1 is connected. The pipe is connected to a fluid outlet of a compressor, and the valve located downstream of the compressor. The piston 5 is sealed to the cylinder 6 to prevent leakage of the compressed air to atmosphere. The connection to the pipe is provided on the inlet side of the flap 2, to allow the flap to function initially if the pipeline starts off at atmospheric pressure.

Figure 3:
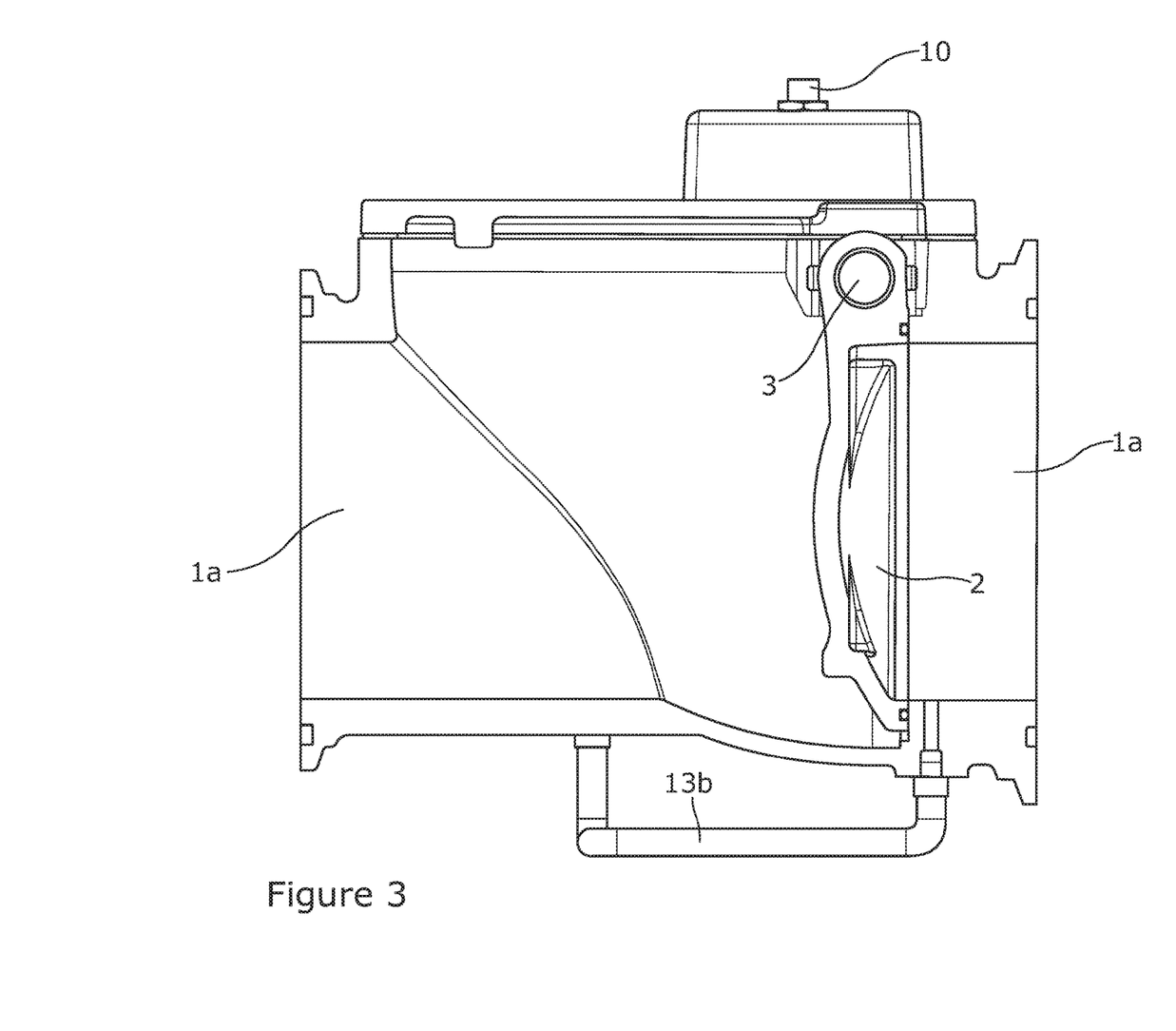
FIG. 3 is a longitudinal cross-section of the check valve.

The check valve 1 further comprises a control signal port or terminal 12 which is arranged to receive a signal (directly or indirectly) from a compressor. The input to the port 12 controls the function of a solenoid switching valve, illustrated schematically at 13. The valve contains a solenoid which is configured to switch the source of pressure to which the lower sub-chamber of the chamber 6 is connected. The switching valve 13 is connected to atmospheric pressure by way of a conduit or inlet 13a, and is also connected to the pressure of air within the pipe which has been output by the compressor by way of a conduit 13b. The conduit 13b connects an aperture in the body of the check valve located upstream of the flap 2, as best seen in FIG. 3, to the switching valve 13. The switching valve 13 further comprises an outlet 13c, which fluidically connects to the lower sub-chamber of the cylinder 6.

The vent 10 and the inlet 13a being connected to atmospheric pressure may be thought of more generally as being connected to a reference pressure, which allows a pressure differential to be achieved, as is described in more detail below. Moreover, the vent 10 and 13a may be connected to an inlet of the compressor. This is advantageous in the case of the use of a toxic gas, which would otherwise be vented to atmosphere can instead be contained with the fluid system.

Specifically, the terminal 12 is arranged to receive a signal which is indicative of whether a power supply to the compressor changes from an ON state to an OFF state, or the compressor otherwise ceases operation (at least as far as delivering compressing air). Receipt of a signal indicative of a state transition causes the secondary activation mechanism to be energised. In practice, this control of the check valve 1 may be achieved by the actuator causing the flap 3 to remain in an open condition as long as a signal is received which is indicative of the compressor's compression function being in operation/running so as to deliver/output compressed air. In the absence of receipt of such a signal at the terminal 12, the solenoid of the switching valve is configured to cause the pressure source to the lower sub-chamber to be connected to atmospheric pressure. Alternatively, a predetermined signal may be output to the terminal 12 which is indicative of a change of operational status of the compressor to a powered down or OFF condition, in relation to its compression delivery functionality. Therefore, the input terminal 12 is connected, directly or indirectly, to the compressor so as to effect the control of the actuator. Thereby, the operational mode of the valve is dependent on the operational status of the compressor.

The switching valve 13 comprises a single 3-port solenoid activated valve. It will be appreciated that the switching valve could also be a valve(s) operated by means other than electrical activation, such as mechanical, hydraulic or pneumatic means. For example, the respective sub-chamber of the actuator assembly could be connected by a conduit to the fluid displacement device and then to a pressure sensor which outputs a signal to the controller.

The switching valve 13 may alternatively comprises two solenoid-operated air control valves which change the medium to which the lower side of the cylinder 6 is connected to. One of the valves is normally open; the other is (normally) closed. When no electrical signal is applied, the valves default to these positions. When electrical signal is applied, they assume the opposite state.

When no electrical signal is applied via the input terminal 12, the check valve 1 operates as a conventional check valve: it opens when pressure at the inlet is greater than at the outlet, and closes when the opposite is true. The movement is caused by the pipeline pressure acting across the flap, causing it to lift open when the pump starts, begins dropping under its own weight and/or the action of a spring when the flow is reversing, and closes fully due to reversal of pressure across it. Since the lower portion of the cylinder 6 is connected by the valve 13 to atmosphere (the top sub-chamber is always connected to atmosphere), there is no significant force acting on the piston 5, apart from some damping due to the small air passages of the secondary activation system. The piston 5 (which is mechanically linked to the flap of the check valve) is moved by the flap, and applies only a small damping force on the flap 2.

When an electrical signal is applied in response to a signal being received at the terminal 12, the solenoid causes the air valves to disconnect the air below the piston 5 from the atmosphere and instead connect it to the air in the pipe which is just upstream of the flap in the main pipe. This means that so long as the pressure in the pipe is higher than atmospheric pressure, there will be an upward force on the piston at all positions of the flap 2, causing the flap to be open (and remain open). The piston 5 and its linkage 7a and 7b to the flap are dimensioned (by way of respective surface areas) so that the expected pipeline pressure during all operating conditions is sufficient to keep the flap fully open (to counteract the closing force of its weight and/or any attached spring). Since the flap 2 is fully open, it does not cause a pressure drop to the fluid flowing in the main pipe. Conversely, the flow in the pipe applies very little force to the flap, and its position is controlled primarily by the piston 5. The piston area can be smaller than the flap 2 area.

Thus when the electrical signal is applied, the check valve 1 will not function as a normal or regular check valve, because it will not partially close when a low-pressure rarefaction passes through it (as long as the lowest pressure in the pulse is still above atmospheric, and sufficient to keep the piston at the top of its stroke by resisting the closing force of the flap). The flap will also not close in case of a flow reversal, as the pressure in the pipe will likely still be above atmospheric even if the flow reverses (this will be the case until the pipe network has fully drained to come down to atmospheric pressure).

This means that by applying the electrical signal, the non-return nature of the valve is overridden or bypassed, and in almost all circumstances (while the electrical signal is applied) it becomes a manually or forced opened valve (with no capability to manually close it). To satisfy the non-return criteria of a check valve to protect the pipeline and compressor, the electrical signal is disconnected when any issues arise. This can be achieved by using a range of sensors on the compressor and/or the pipeline, as well as by connecting the valve to the same electrical supply as the compressor. These serve as protective measures (which cause the check valve to adopt its passive mode) and may include determining that when power is lost, for example.

Figure 6:
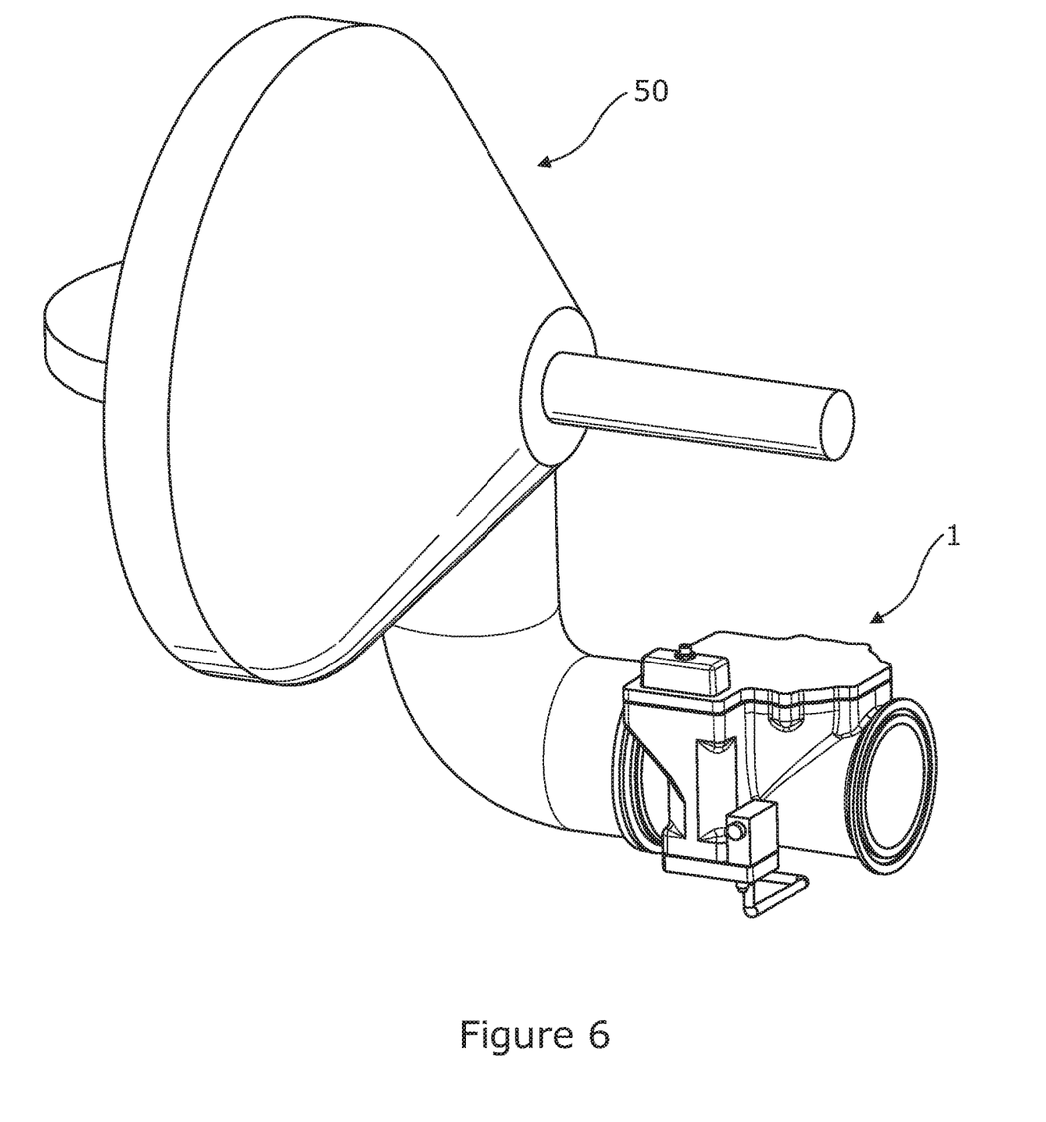
FIG. 6 shows the check valve connected to the fluid outlet of a compressor.

Reference is made to FIG. 6 which shows the check valve 1 connected to a fluid outlet of a rotary piston and cylinder device 50.

Figure 4:
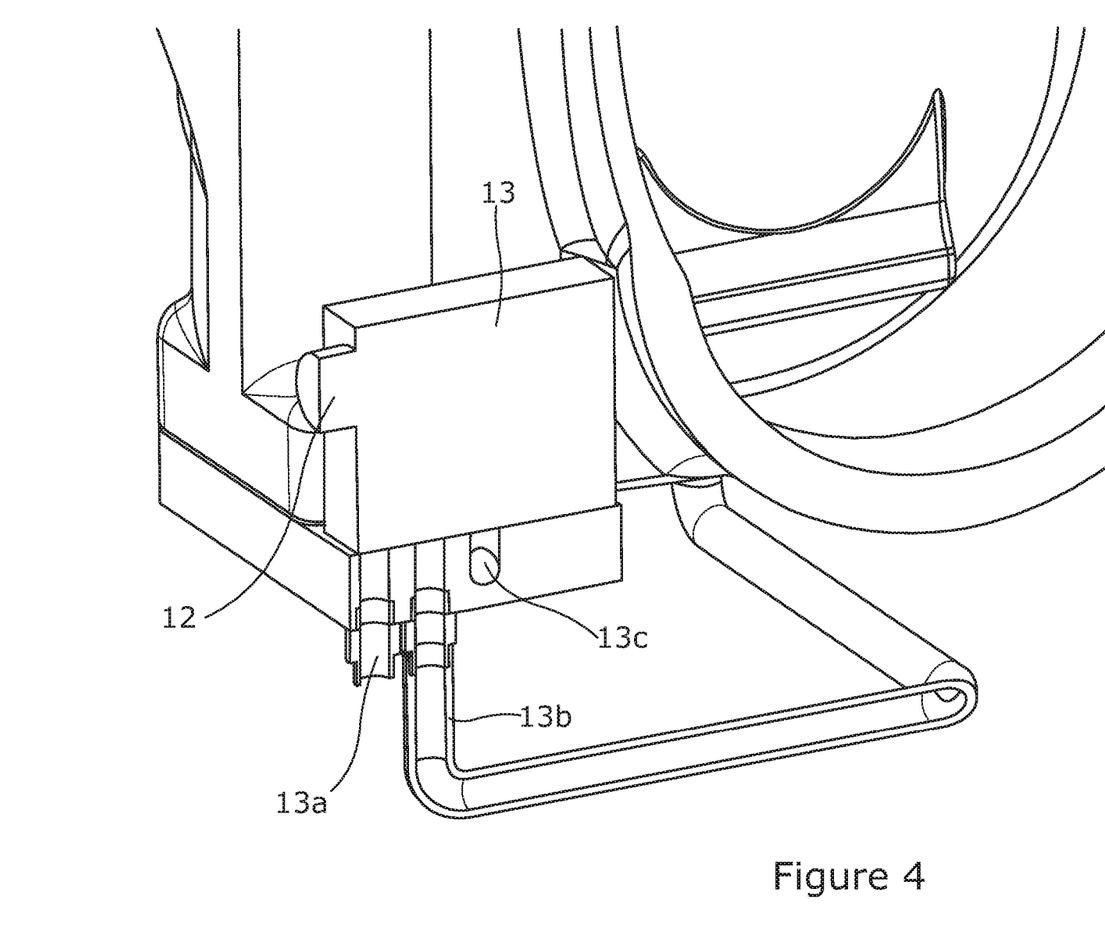
FIG. 4 is an enlarged view of a solenoid control assembly of the check valve.
Figure 5:
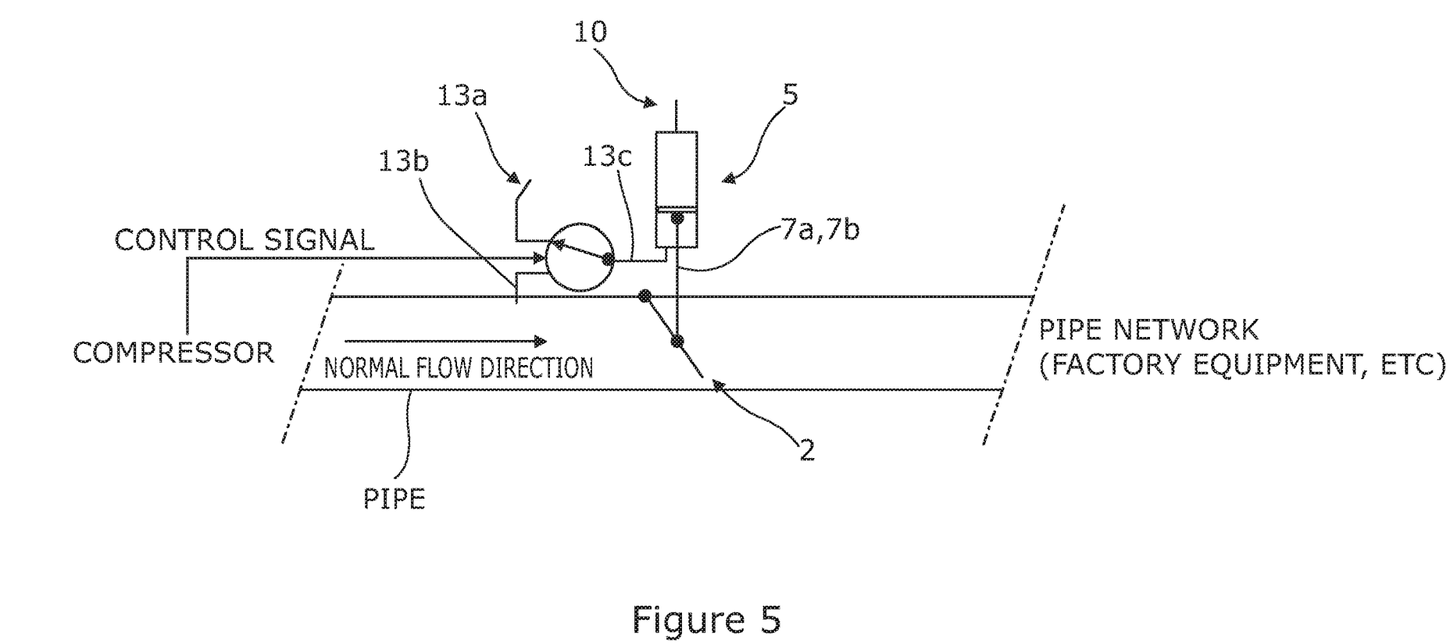
FIG. 5 is schematic diagram of check valve.

It will be appreciated that the obturator 2 in FIGS. 2, 3 and 4 is in a closed condition. In FIG. 5, the obturator 2 is shown in a partially open condition as a result of the pressure applied by the fluid flow, but without the assistance of activation of the actuator.

The invention claimed is:

1. A check valve comprising an obturator and a biasing mechanism, the biasing mechanism arranged to urge the obturator towards a closed condition;

the check valve further comprising an actuator assembly which is arranged to be selectively activated to cause the obturator to be in a more fully open condition from a less open position, when the actuator assembly is activated the actuator assembly is arranged in use to override the biasing mechanism, and a controller arranged to maintain the activation of the actuator assembly to hold the obturator in an open condition during operation of a fluid displacement device to urge fluid through a fluid port of the device, which fluid port the check valve is connected to;

the check valve comprising the controller which has a control signal input to cause the controller to selectively activate the actuator assembly, where the control signal is indicative of one of the obturator being in the less open condition caused by fluid flow and fluid flow to the obturator, and where the controller is further arranged to de-activate the actuator assembly in response to receipt of a control input which is indicative of either a depowering of the fluid displacement device or of a change in operational status of the fluid displacement device from an operational condition to a non-operational condition.

2. A check valve as claimed in claim 1 in which the actuator assembly arranged, when activated, to open the obturator to a greater extent from a partially open condition.

3. A check valve as claimed in claim 1 in which the controller comprises a terminal or a port, which is arranged to receive an electrical signal, pneumatic or mechanical signal.

4. A check valve as claimed in claim 1 in which the actuator assembly comprises a pressure-activated actuator.

5. A check valve as claimed in claim 1 in which the controller is arranged to cause one of two fluid pressure sources to act at least in part on the actuator assembly.

6. A check valve as claimed in claim 5 in which connection of the actuator to one pressure source permits the biasing mechanism to operate, and connection to the other pressure source causes the obturator to be urged into the open condition.

7. A check valve as claimed in claim 5 in which the controller comprises a switch which is arranged to bring about control of which pressure source the actuator assembly is connected to.

8. A check valve as claimed in claim 1 in which the actuator assembly comprises a motive component of which opposing sides or ends are arranged to be acted on by a respective pressure source, and the fluid pressure to which at least one of the sides/ends of the component is subjected to is controlled by the controller.

9. A check valve as claimed in claim 8 in which the controller is arranged to allow the motive component to be selectively subjected to a pressure differential in which one side/end of the motive component is subjected to a higher fluid pressure than the other side/end of the motive component.

10. A check valve as claimed in claim 9 in which the controller further allows both ends/sides of the motive component to be selectively subjected to substantially equal fluid pressures.

11. A check valve as claimed in claim 10 in which the check valve is such that the fluid pressure to which one side/end of the motive component is subjected to is not alterable to another pressure by the controller.

12. A check valve as claimed in claim 11 in which said side/end of the motive component may be substantially invariably be connected to a single fluid pressure source.

13. A check valve as claimed in claim 1 in which the controller comprises a switching valve.

14. A check valve as claimed in claim 1 in which the actuator assembly comprises a piston which is moveable within a piston chamber, and the piston defines two sub-chambers, a first sub-chamber which is selectively connectable to a first pressure and to a second pressure, and a second sub-chamber which is connected to the first pressure.

15. A check valve as claimed in claim 14 further comprising a switching valve arranged to control which of the first fluid pressure and the second fluid pressure is connected with the first sub-chamber.

16. A check valve as claimed in claim 14 wherein the first fluid pressure is lower than the second fluid pressure.

17. A check valve as claimed in claim 16 in which the first fluid pressure is atmospheric pressure and the second fluid pressure is the pressure of fluid in a fluid containing conduit to which the check valve is arranged to be operatively connected.

18. A check valve as claimed in claim 14 wherein the first fluid pressure is greater than the second fluid pressure.

19. A check valve as claimed in claim 18 in which the first fluid pressure is atmospheric pressure and the second fluid pressure is a vacuum.

20. A check valve as claimed in claim 1 further comprising a first conduit which connects the controller to a first pressure and a second conduit which connects the controller to a second fluid pressure.

21. A check valve as claimed in claim 20 in which the controller comprises a third conduit which operatively connects the controller to the actuator assembly.

22. A check valve as claimed in claim 1 which comprises a linkage which connects the actuator assembly to the obturator.

23. A check valve as claimed in claim 1 in which the controller is arranged to de-activate the actuator assembly in response to an absence of a signal input to the controller indicative of the operation of a fluid displacement device, a fluid port of which the check valve is connected to.

* * * * *